Dec. 17, 1968  AMADO Y. CABEZAS ET AL  3,417,345

HIGH RADIANCE LASER

Filed Aug. 21, 1964    3 Sheets-Sheet 1

INVENTORS.
AMADO Y. CABEZAS,
LARRY G. DE SHAZER,
BY J. K. Haskell
ATTORNEY.

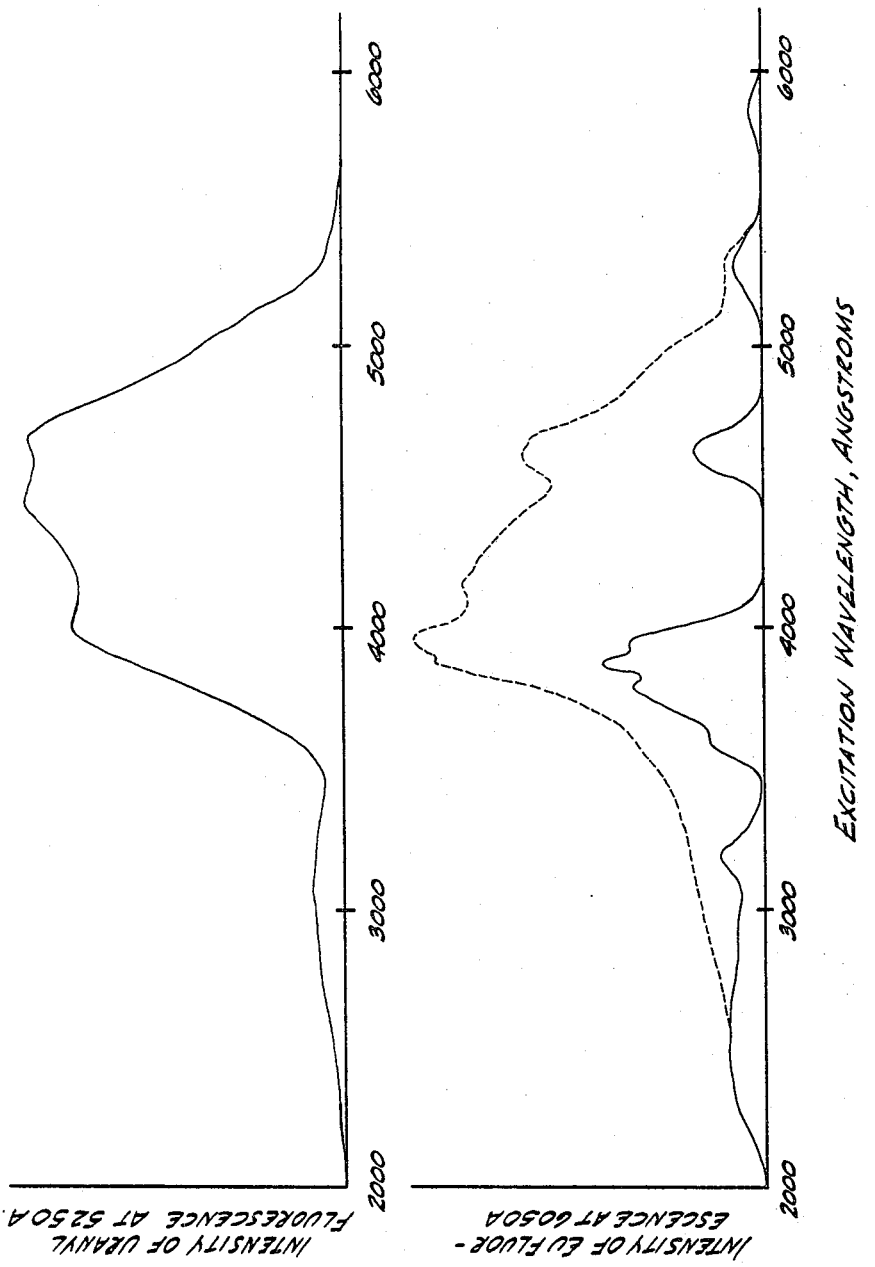

United States Patent Office 3,417,345
Patented Dec. 17, 1968

3,417,345
HIGH RADIANCE LASER
Amado Y. Cabezas, Los Angeles, and Larry G. de Shazer,
Westchester, Calif., assignors to Hughes Aircraft Company, Culver City, Calif., a corporation of Delaware
Filed Aug. 21, 1964, Ser. No. 391,165
3 Claims. (Cl. 331—94.5)

ABSTRACT OF THE DISCLOSURE

This is a high radiance laser wherein a source of optical frequency exciting energy is coupled to an ion doped glass laser element disposed in a regenerative cavity. The laser element contains primary and secondary ions and the exciting energy pumps the primary ion to a superfluorescence state and thereby produces superfluorescent radiative energy. This radiative energy is absorbed by the secondary ion in the laser element and excites the secondary ion to a laser state to thereby produce coherent light energy at a wavelength characteristic of the secondary ion.

---

Since the summer of 1960 when Dr. T. H. Maiman reported the first operational laser in an article entitled "Optical Maser Action in Ruby," Nature, 137, p. 493, laser action has been observed in many different materials and in every physical state. In the years following the Maiman achievement, work has constantly been done to develop a laser that would have high peak power and a very narrow beam width and operable in the visible spectrum.

The reason for the desire that the laser have high peak power and a narrow beam width, generally known as "high radiance," is obvious. High energy density is thereby achieved which has a myriad of advantages. For example, high energy density would be highly desirable in the laser communication and ranging fields.

The desirability that a high radiance laser operate in the visible spectrum is primarily based on the fact that generally the most sensitive photodetectors operate in the visible spectral region since photons in this region have higher energy than those in the infrared region.

To achieve narrow beam width, it is necessary that the laser material be of good optical quality. In view of the necessity for high optical quality, much effort has been directed to the utilization of glass as a host for lasing ions suspended therein. One successful high radiance glass laser is the neodymium laser where neodymium ions are suspended in a glass host structure. This is probably the only true high radiance glass laser available in the prior art, but it has a major disadvantage—it does not emit visible light energy. The neodymium laser output is in the infrared spectral region and thus is not as desirable as a glass laser emitting visible light energy.

It is known that there are in existence ions which could be used as a dopant for glass to produce visible laser light energy but which are not easily pumped by external pumping means such as mercury arc or xenon flashlamps. This problem is caused by such factors as (1) the wavelength of the major pump bands, (2) the pump bandwidth, and (3) the absorption cross section. These factors lead to the fluorescence conversion efficiency $\eta$ for the ion, which is defined as the number of fluorescence photons per incident (to the glass) photon. The following table compares the pumping parameters of $Nd^{3+}$ and $Eu^{3+}$.

| | Wavelengths of major pump bands (A.) | Pump band-width (A.) | Absorption cross section, $\sigma \times 10^{-21}$ (cm.$^2$) | Fluorescence conversion efficiency, $\eta$ |
|---|---|---|---|---|
| $Nd^{3+}$ | 8,800 | 200 | 2 | 0.26 |
| | 8,100 | 250 | 5 | 0.35 |
| | 7,400 | 200 | 5 | 0.35 |
| | 5,800 | 320 | 9 | 0.42 |
| $Eu^{3+}$ | 3,940 | 300 | 3 | 0.06 |

The absorption cross sections $\sigma$ were obtained from the ratios of the measured absorption coefficients and the estimated ion concentrations. The fluorescence conversion efficiencies $\eta$ were measured using a light integrated sphere method as described by P. J. Botden and F. A. Kroger in Physica, 15, 747 (1949). From the table, it is observed that it is much easier to pump Nd than Eu because of the greater number and higher efficiencies of the Nd pump bands.

In view of the above, it is quite evident that the ability to provide a glass laser in which $Eu^{3+}$ and other ions are made to lase in the visible spectral region would be a substantial advancement to the laser art.

Accordingly, one object of the present invention is to provide an improved laser capable of generating new laser frequencies in the visible spectrum.

Another object of this invention is to provide a high radiance laser which produced light energy in the visible spectrum.

Still another object of the invention is to provide a glass laser which produces high peak power energy in a narrow beam, the frequency of which is detectable by most present-day sensitive photoemissive devices.

These and other objectives are achieved in a high radiance laser comprising a resonant cavity, a glass host material disposed therein, and a pump energy generator producing pump energy which is coupled to a glass host material. To provide laser action, primary ions are uniformly disposed within the glass host material. These ions are coupled to and excited by the pump energy to a superfluorescent state and thereby produce superfluorescent fluxes. Also disposed uniformly in the glass host material are secondary ions which are coupled to and excited by the superfluorescent fluxes emitted by the primary ions to produce a coherent light energy output.

The invention and specific embodiments thereof will be described hereinafter by way of example and with reference to the accompanying drawings, in which:

FIG. 3 is a comparison of the intensities of Eu fluorescence at 6050 A. and uranyl fluorescence at 5250 A.

Figure 1:
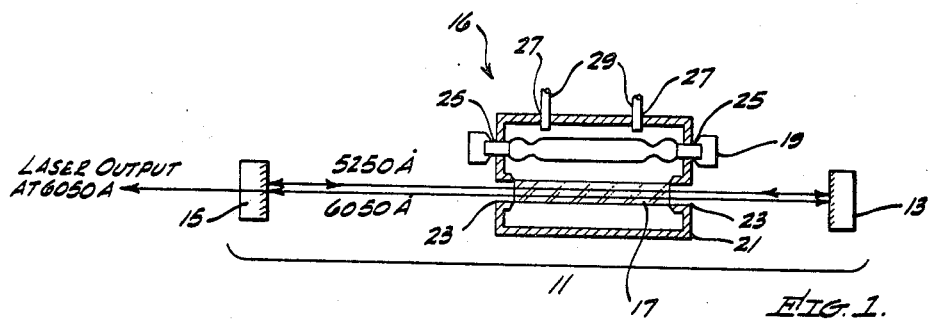
FIG. 1 is a schematic diagram of one embodiment of a laser incorporating the basic features of the invention.

Referring now to the drawings and more particularly to the high radiance laser for producing coherent light energy of FIG. 1, there is shown an optical frequency resonant cavity 11 comprising a substantially totally reflective silvered mirror 13 at the right and a dielectric flat 15 at the left which is 99% reflective at 5250 A. and 50% reflective at 6050 A. Disposed within the resonant cavity 11 is a laser head assembly 16 including an ion doped glass rod 17 within which, in this case, are uniformly distributed europium-uranyl ions in the approximate proportion of 1% $UO_2^{2+}$–3% $Eu^{3+}$. The uranyl complex or ion ($UO_2^{2+}$) may be pumped by a pulsed high pressure mercury arc flashlamp 19 as shown or by a conventional doubled-pulsed xenon flashlamp (not shown).

The pump light emitted by the flashlamp 19 is concentrated on the glass rod 17 by means of a conventional elliptical reflector cavity 21 which encloses both the glass rod 17 and the flashlamp 19. The elliptical reflector cavity 21 includes openings 23 at each end to allow for the passage of regenerated light energy, and openings 25 which provide means for mounting the flashlamp 19. Also included in the upper portion of the elliptical cavity 21 are openings 27 fitted with short pipes 29 which allow for the connection of a forced air cooling system (not shown) to maintain the mercury flashlamp 19 and the glass rod 17 at permissible operating temperatures. The mercury arc flashlamp 19 is connected to a conventional source of pulses high potential energy which is not shown for the sake of simplicity.

In operation, once forced air cooling is established within the elliptical resonant cavity 21, the mercury arc flashlamp 19 is energized to thereby produce intense optical pump energy. This pump energy is coupled to the uranyl ion ($UO_2^{2+}$) and thereby excites this ion to a superfluorescent state. Superfluorescence, known also as superradiance and photon avalanche and self-stimulated emission, is a term to describe a radiative transition through amplification by an inverted ion population of its own spontaneous decay. This phenomenon is described in articles found in Quantum Electronics III (1963) by W. R. Sooy et al.; Journal of Applied Physics, 35, p. 1134 (1964) by L. Tonks; and Journal of Applied Physics, 35, p. 1680 (1964) by T. Waite.

The $UO_2^{2+}$ ion may be considered for the purpose of description as the primary ion. The main function of this primary ion is to absorb the light energy from the pump flashlamp 19 and to thereby be raised to a superfluorescent energy state in a resonant cavity environment such as resonant cavity 11. This will produce superfluorescent radiative energy of a desired wavelength—in this case 5250 A. for $UO_2^{2+}$. The superfluorescent energy or flux, in turn, is absorbed by the europium ion ($Eu^{3+}$) which is also uniformly disposed within the glass rod 17 and described hereinafter as the secondary ion. In order to provide for lower exciting intensity, the secondary ion may be one capable of at least partially lasing in a four level system but a three level or a combination three and four level scheme will give the desired result. A thorough description of three and four level systems is described by T. H. Maiman in an article in Physical Review, vol. 123, pp. 1145–1150.

Once the secondary ion is pumped to a lasing state, it will produce coherent light energy at a wavelength characteristic for the particular ion utilized—in this case 6050 A. for $Eu^{3+}$. This frequency is in the yellow spectral region and, as discussed previously, is very desirable. FIG. 1 illustrates that substantially all of the 5250 A. flux emitted from the primary ion $UO_2^{2+}$ is confined within the resonant cavity 11. However, the dielectric flat 15 is only 50% reflective at the wavelength of the coherent emission of the $Eu^{3+}$ secondary ion (6050 A.) and therefore this energy is available as an output from the laser.

It is an essential requirement for operation of the device described that the frequency of emission of the primary ion be within one of the absorption bands of the secondary ion for pumping of the secondary ion to occur. However, the primary ion emission need not occur in the major absorption band of the secondary ion but may be absorbed by a lesser absorption band as can be seen in FIG. 2.

Figure 2:
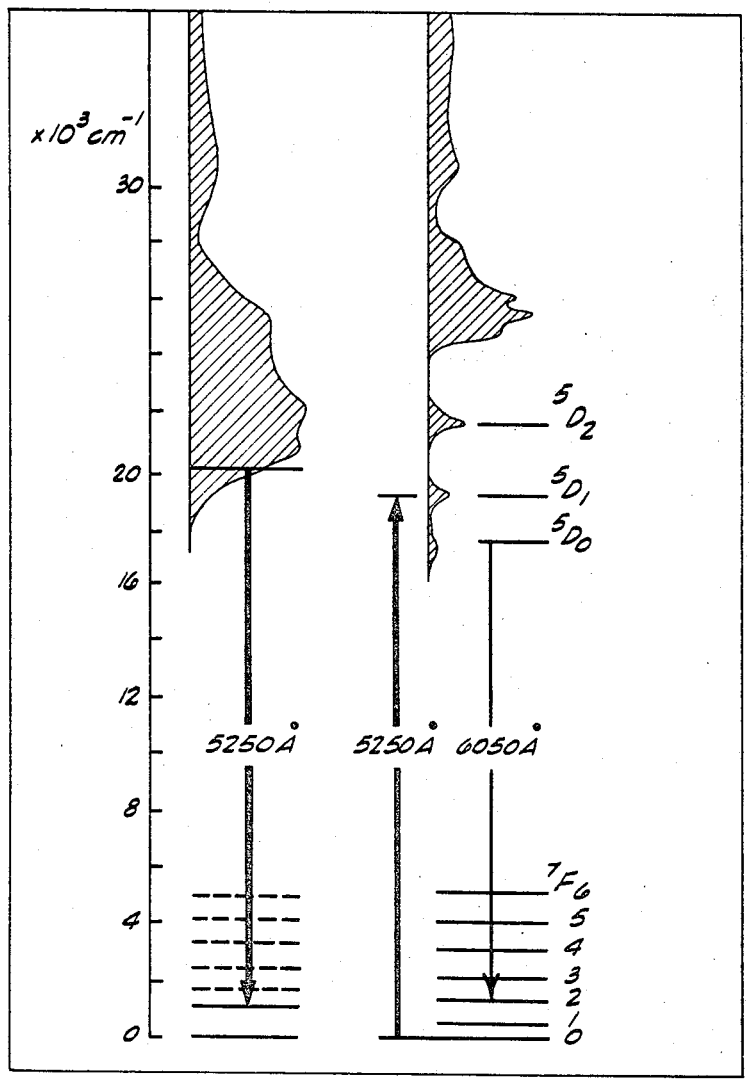
FIG. 2 is an energy level diagram comparing $UO_2^{2+}$ ions and $Eu^{3+}$ ions in borosilicate glass at room temperatures.

FIG. 2 shows the energy levels of $UO_2^{2+}$ and $Eu^{3+}$ in borosilicate glass at room temperature. Here, the excitation spectrum of the fluorescence from each ion and the radiative energy transfer between them is illustrated. Note that the primary ion ($UO_2^{2+}$) emission and the wavelength of the $5_{D_1}$ absorption band of $Eu^{3+}$ are substantially the same. This provides the energy transfer between the ions and is the reason for the above-noted essential requirement.

The comparison of ion intensity versus excitation wavelength diagrams of FIG. 3 is shown to illustrate that by utilizing the superfluorescent radiative transfer between the primary and secondary ions a new effective pump band (dotted line) is created. The A portion of FIG. 3 shows the room temperature excitation spectrum of 5250 A. fluorescence of only $UO_2^{2+}$ ions in borosilicate glass. The B portion of FIG. 3 gives a comparison of the room temperature excitation spectra of the 6050 A. fluorescence of $UO_2^{2+}-Eu^{3+}$ glass with that of $Eu^{3+}$ glass.

Although in this description the primary ion has been designated as the uranyl ion ($UO_2^{2+}$) and the secondary ion as the europium ion ($Eu^{3+}$), other combinations of ions may be utilized within the scope of the invention where the primary ion through a superfluorescent radiative transfer pumps a secondary ion to a lasing state to produce coherent light energy. Some of the lesser important considerations which will be helpful in determining whether a particular ion may efficiently be used as a primary ion are that the ion must have a relatively high absorption band for optical pumping and a high quantum efficiency for the superfluorescent energy emitted. The term, high quantum efficiency, is defined as the ratio of the energy emitted to the energy absorbed. This term is discussed by W. Kaiser, C. Garrett and D. Wood in an article in Physical Review, 123, pp. 766–776.

With regard to the secondary ion, the considerations are that the emitting state of the laser transition should preferably have a relatively long lifetime. For example, $Eu^{3+}$ has a 2.3 millisecond lifetime. The secondary ion must, of course, also have an absorption band capable of absorbing at least a portion of the superfluorescent flux emitted by the primary ion and should preferably have a high quantum efficiency.

Figure 4:
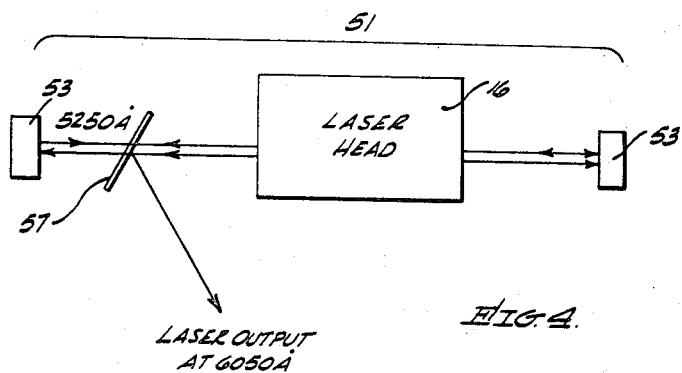
FIG. 4 is a schematic diagram of another embodiment of the laser of FIG. 1.

FIG. 4 illustrates an alternate configuration for the resonant cavity 11 which eliminates the necessity of the relatively expensive dielectric flat 15 shown in the embodiment of FIG. 1. Here, the resonant cavity 51 comprises a silvered mirror 53 disposed on each side of the laser head assembly 16. The operation of this embodiment is essentially the same as that described in connection with FIG. 1 except for the means of obtaining an output from the device. Here, the superfluorescent energy at 5250 A. propagates through a beam splitter element 27 which is antireflection coated for 5250 A. This superfluorescence is then reflected by both silvered mirrors 53 and provides a regenerative loop to support the emission from the primary ion. However, a portion of the coherent light energy output emitted by the secondary ion is reflected by the beam splitter element 57 and is thereby available as the coherent light energy output of the laser at 6050 A. for $Eu^{3+}$.

From the foregoing, it will be seen that the generation of high radiance coherent light energy in desired portions of electromagnetic spectrum is achieved in the laser herein described.

Although two specific embodiments have herein been illustrated, it will be appreciated that other organizations of the arrangements shown may be made within the spirit and scope of the invention. For example, other types of pumping methods may be employed and different resonant cavity configurations may be utilized in practicing the invention. Also, the silvered mirror 13 in FIG. 1 or one of the mirrors 53 may be replaced by a pulsed reflector such as a rotating prism for Q-switching operation.

Accordingly, it is intended that the foregoing disclosure and the showings made in the drawings shall be considered only as illustrations of the principles of this invention and are not to be construed in a limiting sense.

What is claimed is:

1. A high radiance laser for producing coherent light energy, comprising: a resonant cavity for supporting energy produced within said cavity including a silvered mirror on one end and a dielectric flat at the other end, said dielectric flat being adapted to have a wavelength correlated coefficient of reflectivity; pump means including a pulsed high pressure mercury arc flash-lamp for producing pump energy; a borosilicate glass rod disposed within said cavity; an elliptical reflector cavity for coupling the pump energy to said glass rod, said glass rod having polished optically flat end surfaces and being at least partially transparent to the pump and coherent light energies; an approximate 1% concentration by weight of $UO_2^{2+}$ ions uniformly disposed within said glass rod and coupled to and excited by the pump energy to a superfluorescent state to produce superfluorescence which is of a wavelength to be substantially reflected by both said silvered mirror and said dielectric flat; and an approximate 3% concentration by weight of $Eu^{3+}$ ions uniformly disposed within said glass rod and coupled to and excited by the superfluorescence to at least a partial four level laser state to produce the coherent light energy which is substantially reflected by said silvered mirror but which because of its wavelength is partially transmitted through said dielectric flat.

2. A high radiance laser for producing coherent light energy, comprising: a resonant cavity for supporting energy produced within said cavity including a silvered mirror on one end and a dielectric flat at the other end, said dielectric flat being adapted to substantially reflect all 5250 A. energy but to transmit only 50% of all 6050 A. energy incident thereon; pump means including a pulsed high pressure mercury arc flashlamp for producing pump energy; a borosilicate glass rod disposed within said cavity; an elliptical reflector cavity for coupling the pump energy to said glass rod, said glass rod having polished optically flat end surfaces and being at least partially transparent to the pump and coherent light energies; $UO_2^{2+}$ ions uniformly disposed within said glass rod in an approximate 1% concentration by weight and coupled to and excited by the pump energy to a superfluorescent state to produce superfluorescence at 5250 A. which is substantially reflected by both said silvered mirror and said dielectric flat; and $Eu^{3+}$ ions uniformly disposed within said glass rod in an approximate 3% concentration by weight and coupled to and excited by the superfluorescence to at least a partial four level laser state to produce the coherent light energy at 6050 A. which is substantially reflected by said silvered mirror but which is partially transmitted through said dielectric flat.

3. A high radiance laser for producing coherent light energy, comprising: a resonant cavity for supporting energy produced within said cavity including a pair of parallel silvered mirrors disposed at each end of said cavity orthogonally to the longitudinal axis of said cavity; pump means including a pulsed high pressure mercury arc flashlamp for producing pump energy; a borosilicate glass rod having polished optically flat end surfaces disposed within said cavity; an elliptical reflector cavity for coupling the pump energy to said glass rod; $UO_2^{2+}$ ions uniformly disposed within said glass rod in an approximate 1% concentration by weight and coupled to and excited by the pump energy to a superfluorescent state to produce superfluorescent fluxes at 5250 A.; $Eu^{3+}$ ions uniformly disposed within said glass rod in an approximate 3% concentration by weight and coupled to and excited by the superfluorescent fluxes to a lasing state to produce the coherent light energy at 6050 A.; and output means including a beam splitter element antireflection coated for 5250 A. disposed within said cavity in a position to intercept and reflect the coherent light energy in a direction other than along the longitudinal axis of said cavity.

References Cited

UNITED STATES PATENTS

| | | | |
|---|---|---|---|
| 3,314,021 | 4/1967 | Haun et al. | 331—94.5 |
| 3,349,339 | 10/1967 | Thorington | 331—94.5 |
| 3,353,115 | 11/1967 | Maiman | 331—94.5 |

JEWELL H. PEDERSON, *Primary Examiner.*

R. L. WIBERT, *Assistant Examiner.*

U.S. Cl. X.R.

106—54